United States Patent

[11] 3,573,740

[72] Inventors Melvyn S. Berger
Canoga Park;
Bob J. Baker, Hawthorne, Calif.

[21] Appl. No. 742,354
[22] Filed July 3, 1968
[45] Patented Apr. 6, 1971
[73] Assignee The National Cash Register Company
Dayton, Ohio

[54] COMMUNICATION MULTIPLEXER FOR ONLINE DATA TRANSMISSION
16 Claims, 9 Drawing Figs.

[52] U.S. Cl. 340/172.5
[51] Int. Cl. G06f 3/00, H04j 3/00
[50] Field of Search 340/172.5; 235/157

[56] References Cited

UNITED STATES PATENTS

| | | | |
|---|---|---|---|
| 3,063,036 | 11/1962 | Reach et al. | 340/172.5 |
| 3,303,476 | 2/1967 | Moyer et al. | 340/172.5 |
| 3,331,055 | 7/1967 | Betz et al. | 340/172.5 |
| 3,362,015 | 1/1968 | Mackie et al. | 340/172.5 |
| 3,390,379 | 6/1968 | Carlson et al. | 340/172.5 |
| 3,400,373 | 9/1968 | Nicholson | 340/172.5 |
| 3,400,378 | 9/1968 | Smith et al. | 340/172.5 |
| 3,405,393 | 10/1968 | Haselwood | 340/172.5 |
| 3,407,387 | 10/1968 | Looschen et al. | 340/172.5 |
| 3,413,612 | 11/1968 | Brooks et al. | 340/172.5 |
| 3,417,374 | 12/1968 | Pariser | 340/172.5 |

*Primary Examiner*—Paul J. Henon
*Assistant Examiner*—R. F. Chapuran
*Attorneys*—Louis A. Kline and Joseph R. Dwyer

ABSTRACT: A communications system comprised of a multiplexer and a plurality of unit adapters for transferring data characters between a high speed digital computer and a plurality of relatively low speed data transmission devices operating online with the computer. A scanner circuit included in the multiplexer provides for sequential servicing, in turn, each of the unit adapters for transferring the data characters. The scanner circuit may be interrupted at any time such that the computer can transfer a function selector character to any of the unit adapters, the character determining whether the unit adapter will thereafter operate in an input or output mode. Monitor and control logic in each unit adapter has circuitry therein for detecting an overload condition resulting from online operation of the computer system during an input mode of operation, thereby detecting any loss of data in its real time operation and enabling the computer to monitor the circuits to correct the loss of data caused by the overload condition.

FIG. I

INVENTORS
MELVYN S. BERGER
BOB J. BAKER

BY Louis A. Kline
John T. Matlago
THEIR ATTORNEYS

INVENTORS
MELVYN S. BERGER
BOB J. BAKER

BY

THEIR ATTORNEYS

INVENTORS
MELVYN S. BERGER
BOB J. BAKER

BY Louis A Klein
John J. Matlago
THEIR ATTORNEYS

INVENTORS
MELVYN S. BERGER
BOB J. BAKER

Louis A Kline

BY John T. Matlago
THEIR ATTORNEYS

INVENTORS
MELVYN S. BERGER
BOB J. BAKER

BY

THEIR ATTORNEYS

INVENTORS
MELVYN S. BERGER
BOB J. BAKER
BY Louis A. Kline
John J. Matlago
THEIR ATTORNEYS

COMMUNICATION MULTIPLEXER FOR ONLINE DATA TRANSMISSION

This invention relates to a communications system and, more particularly, to a communications multiplexer system for transferring data between a high speed general purpose computer and a plurality of relatively low speed data transmission devices connecting to remotely located data terminals.

The real-time aspects of online data processing are receiving increasing emphasis as the field matures and this trend is expected to continue as the advantages of such applications become more widely known. This growing emphasis requires communication capabilities of greater power and flexibility in the transmission of data between a computer and a number of remote data terminals, such as keyboard inputs, CRT displays, teletype units, etc. The transfer of data from each of the data terminals to the computer and the transfer of processed data from the computer back to the data terminals creates substantial interface problems. One of these problems is the buffer problem caused by the great disparity between the relatively low bit rate transmission of common carrier facilities, e.g., telephone transmission lines, and the higher speed rate with which modern data processing systems handle digital information. A solution to this problem has been the multiplexing of the data transferred between the computer and the data terminals by matching the high speed of the computer to the effective transfer rate of a group of data terminals. This solution has proved particularly satisfactory where the data transfer rate for each data terminal is predictable and continuous for definite periods of time. In these systems, a balanced data transfer is implemented so that no one data terminal consumes a disproportionate share of the communication network to the detriment of the other data terminals and a sufficiently large number of data terminals are concurrently operative so that the computer is not inefficiently idling while awaiting data to be inputted. However, in a real-time processing system where the occurrence and rates of data transfer from each of the terminals is dependent upon the physical events being monitored or controlled, e.g., a CRT display inquiry system, the data transfer rate for each of the data terminals is neither predictable nor continuous for extensive periods of time. It is well recognized that in such an online real-time environment, a peak loading situation will sometimes develop for short intervals of time by a simultaneous attempt of a number of the data terminals to transfer data caused by nearly simultaneous physical events at each of the data terminals and, conversely, there will be periods of time wherein there will be relatively little data to transfer between each of the data terminals and the computer. These dynamic variations in the data transfer load, which are peculiar to an online real-time data processing environment, require that the transfer of data by the communications multiplexer system be continuously monitored and that the multiplexer system be controlled in response to its changing data transfer load in order to obtain a more efficient utilization of the computer's processing capabilities. Many solutions to this problem, resulting in varying degrees of system efficiency, have been proposed, including expensive arrangements of computer hardware and frequently entailing extensive and inefficient software programs.

In accordance with the features of this invention which provide a solution to the aforementioned problem, the communications multiplexer system is comprised of a multiplexer and a plurality of unit adapters connecting to respective data sets. The multiplexer interleaves the transfer of data messages between the unit adapters and a digital computer having an I/O logic section which handles the transfer of data between its memory and peripheral units as disclosed in the commonly assigned copending application Ser. No. 636,147, filed May 4, 1967. The flow of data from or to the computer through each of the unit adapters is affected by the number of unit adapters attempting to transfer data through the multiplexer. Monitoring circuitry is included in each of the unit adapters to detect the occurrence of an input overload condition in the unit adapter. Such an overload condition occurs when a data character received by a unit adapter is not transferred by the multiplexer, which is successively servicing each of the unit adapters, in turn, prior to the receipt of a succeeding data character by the unit adapter. Provision is included in the communications multiplexer for a status character to be sent to the computer, alerting the computer of the occurrence and the identification of the unit adapter operating in an overload condition. The computer, responding under program control, reacts to the occurrence of an overload condition by taking appropriate action for the circumstances and the equipments involved; for example, the computer may temporarily change the mode of operation of the overloaded unit adapter to output a message to the data set requesting that the character be retransmitted to the computer.

Accordingly, one of the objects of this invention is to provide an improved flexible, communications multiplexer system having the foregoing features and advantages.

Another object of the present invention is to provide an improved highly flexible, communications multiplexer system for use in conjunction with a digital computer in a real-time environment, which system serves not only as a buffer for inputs and outputs of the computer but also provides each of the unit adapters an equal opportunity to transfer data between the computer and the data terminals.

Other objects and features of the invention will become apparent to those skilled in the art as the disclosure is made in the following detailed description of a preferred embodiment of the present invention as illustrated in the accompanying sheets of drawings, in which.

In order to provide a clear understanding of the present invention, a preferred embodiment thereof will be considered from a number of viewpoints and in an order which will best reveal its novel features and advantages. First, an overall view of a preferred embodiment of a communications network, including a multiplexer and a plurality of unit adapters, will be presented which will point out the approach of the system for performing multiplexed data transfers between connecting equipments. Next, it will be shown how the flow of data through the component parts of the multiplexer and the unit adapters are sequenced, controlled and monitored. Then, detailed circuit descriptions will be provided to illustrate preferred logical circuitry for the communications network. Finally, the basic system hardware will be considered with particular reference to a real-time, online data processing environment.

Figure 1:
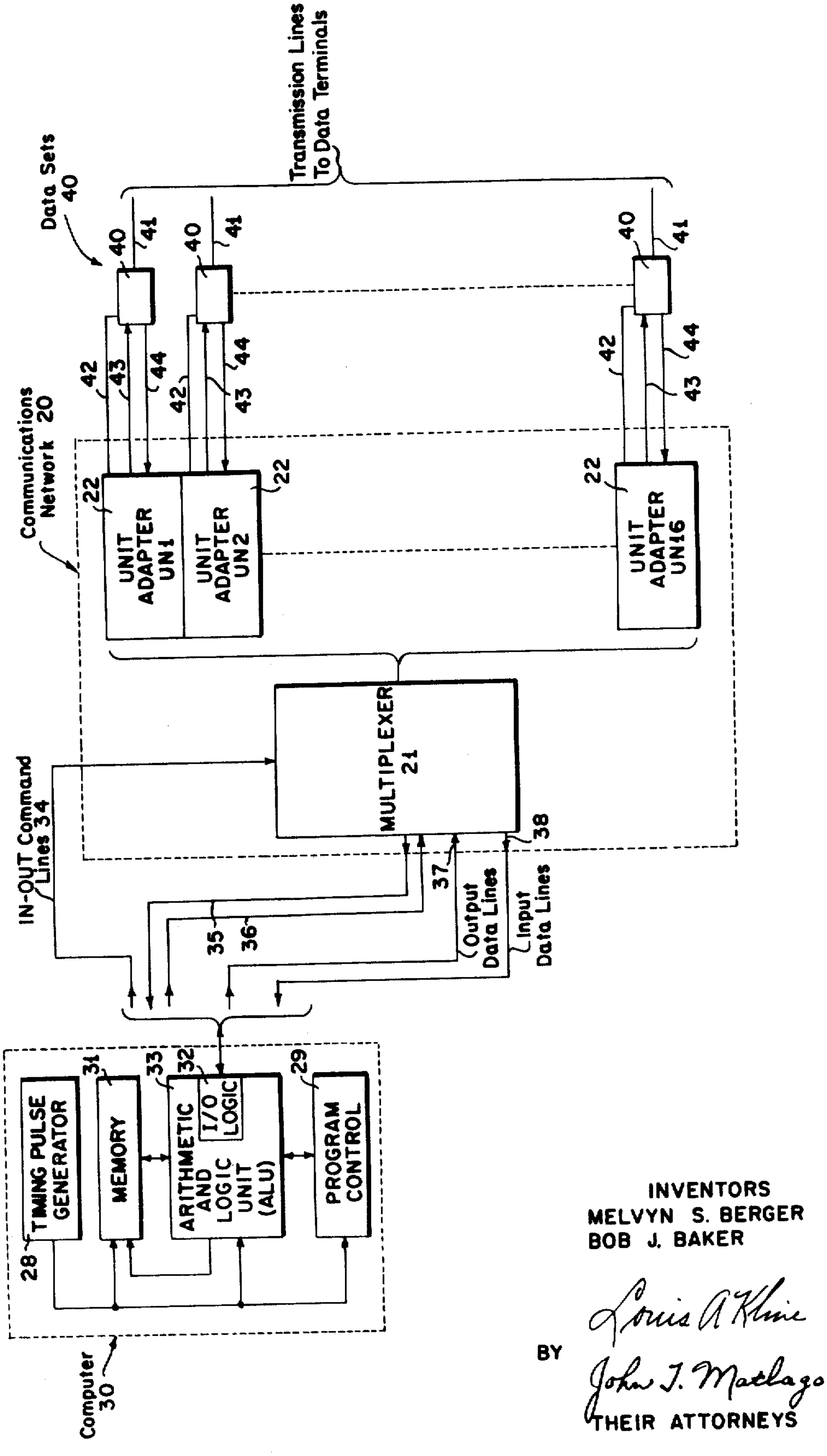
FIG. 1 is a block diagram of a communications multiplexer system connecting between a computer and a plurality of data sets.

The overall view of a communications system which embodies the present communications network is shown in FIG. 1. Communications network 20 connects between a digital computer 30 and a plurality of data sets 40. The communications network 20 includes a multiplexer 21 connected to a plurality of unit adapters 22. The computer 30 is in contact with the multiplexer 21 and each unit adapter 22, designated as UN1, UN2—UN16, respectively, connects to a respective data set 40. Data set 40 may be a Model 202C FM data set as provided by the American Telephone and Telegraph Company which serially transfers binary digits on transmission lines 41 connected to remote data terminals (not shown).

Figure 4:
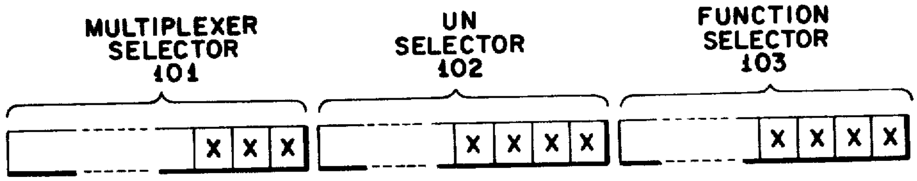
FIG. 4 illustrates the binary coded format of the three-character set transferred from the computer to the multiplexer on the IN-OUT command lines.

The computer 30 is comprised of an arithmetic and logic unit 33 (hereinafter referred to as ALU 33), controlled by a program control 29, and cooperating with a memory 31. The timing for operation within the computer 30 is provided by a timing pulse generator 28. Data is transferred between the memory 31 and devices peripheral to the computer 30 as disclosed in the aforementioned copending patent application under the control of an I/O logic circuit 32, included in ALU 33, the transfer of data being initiated by signals on IN-OUT command lines 34 connecting the I/O logic circuit 32 to the multiplexer 21. The signals on IN-OUT command lines 34 to the multiplexer 21 form three sequentially transferred characters, which enable the computer 30 to control the activity of each of the units UN1, UN2—UN16 connecting to the multiplexer 21. As shown in FIG. 4, these three sequential selector characters include a multiplexer selector character 101 which addresses the multiplexer 21 to the exclusion of other peripheral units that the computer seeks to communicate with, a UN selector character 102 which identifies the particular unit adapter 22 that the computer 30 seeks to control, and a function selector character 103 which is transferred by the multiplexer 21 to the particular unit adapter 22 identified by the prior UN selection character 102. The function selector character 103 causes the selected unit adapter 22 to be established in either an input or output mode of communication, or to be reset.

In response to the three selector character signals on IN-OUT command lines 34, one or more unit adapters 22 and associated data sets 40 are initially selected to be active and operate in either an input or output data transfer mode.

The input data transfer mode provides for a serial transfer of bits from one of the data sets 40 on input data line 44 to its respective unit adapter 22, wherein the bits are assembled into a data character and momentarily stored until the unit adapter is serviced by the multiplexer 21, at which time the data character is transferred, i.e., gated, through the multiplexer 21 to the computer 30. The sixteen unit adapters 22 are arranged to be sequentially serviced in an orderly manner by the multiplexer 21, the scanning operation being momentarily halted when a unit adapter 22 is detected that is active and is ready for a character data transfer to the computer 30. A data character is then transferred from the detected unit adapter 22 through the multiplexer 21 to the I/O logic circuit 32 on input data lines 38. Simultaneously, an address character which identifies the particular unit adapter 22 from which the character is being transferred is transmitted on lines 35 from the multiplexer 21 to the computer 30. The I/O logic circuit 32 transfers the received data character to a storage location in memory 31 reserved for storing characters identified by the address character on lines 35. When the transfer from the multiplexer 21 to the I/O logic circuit 32 is completed, the multiplexer 21 restarts its sequential scanning operation to detect other active unit adapters 22 requiring service.

The output data transfer mode provides for the transfer of data from the computer 30 to a particular data set 40 as directed by the three selector character signals on IN-OUT command lines 34, which control the setting of the circuits and readiness of a unit adapter 22 to receive data for transmission to its associated data set 40. The multiplexer 21 halts its sequential scanning operation when an active unit adapter 22 in an output data transfer mode is detected and an address character is placed on lines 35 to the I/O logic 32 by the multiplexer 21, identifying the particular unit adapter 22 which caused the scanning operation to halt. The character bits of a predetermined storage location in the memory 31 are then transferred in parallel from the I/O logic 32, together with a signal on line 36 to indicate the presence of the character, onto output data lines 37 from the computer 30. The character on lines 37 is transferred through the multiplexer 21 for momentary storage in the requesting unit adapter 22. AFter the character is stored in the requesting unit adapter 22, the multiplexer 21 continues its orderly sequential scanning of unit adapters 22. In the meantime, the bits of the character stored in the unit adapter are converted to a serial format as they are transferred to the respective connecting data set 40 which sends out the bits on respective transmission line 41. When the particular unit adapter 22, still operating in an output transfer mode, has storage available for a subsequent transfer of data from the computer 30, the particular unit adapter 22 will once again be interrogated by the scanner, and request that a data character be transferred to it from the computer.

Figure 2:
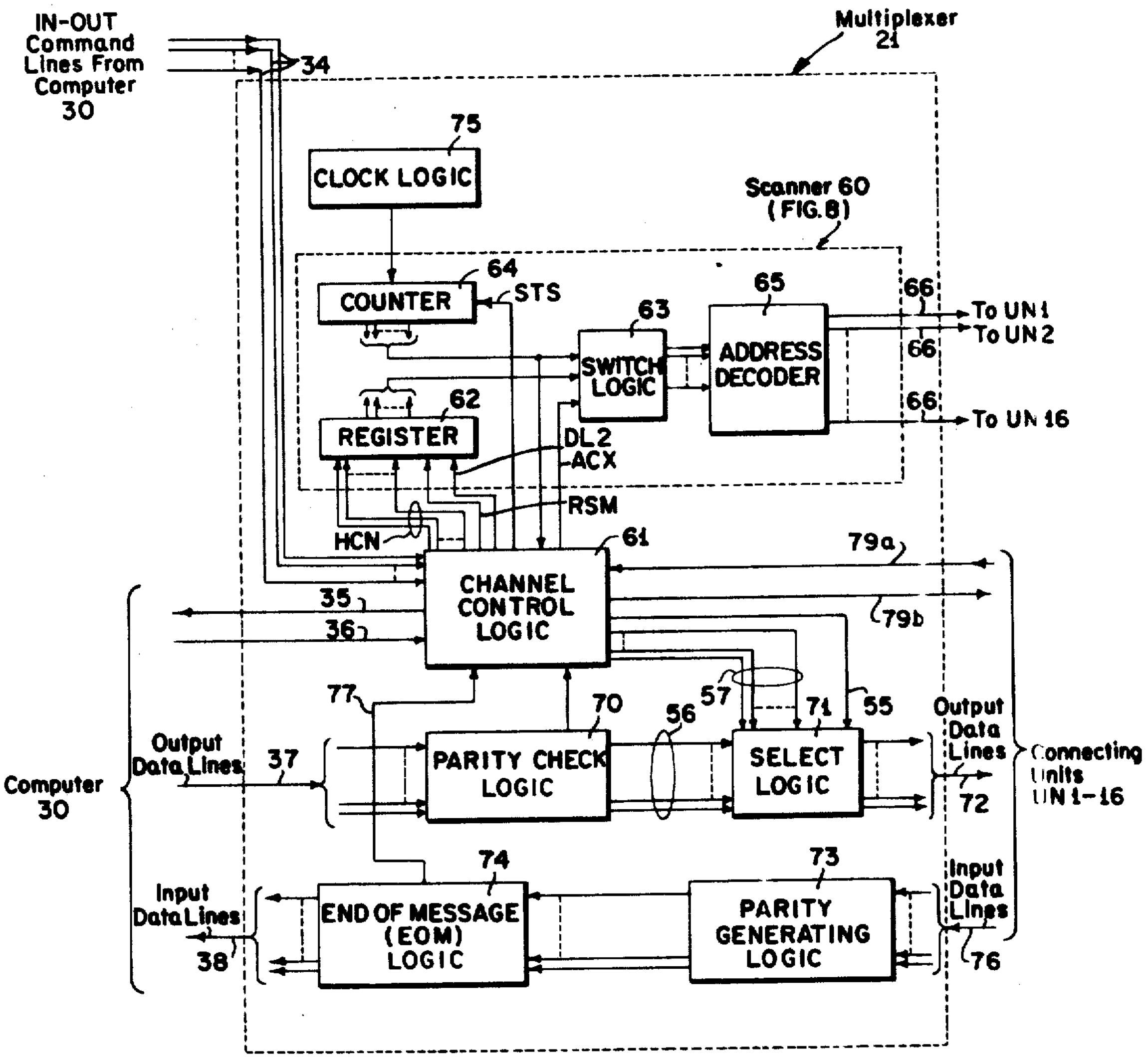
FIG. 2 is a schematic block diagram of the principle components of the multiplexer shown in FIG. 1.
Figure 3:
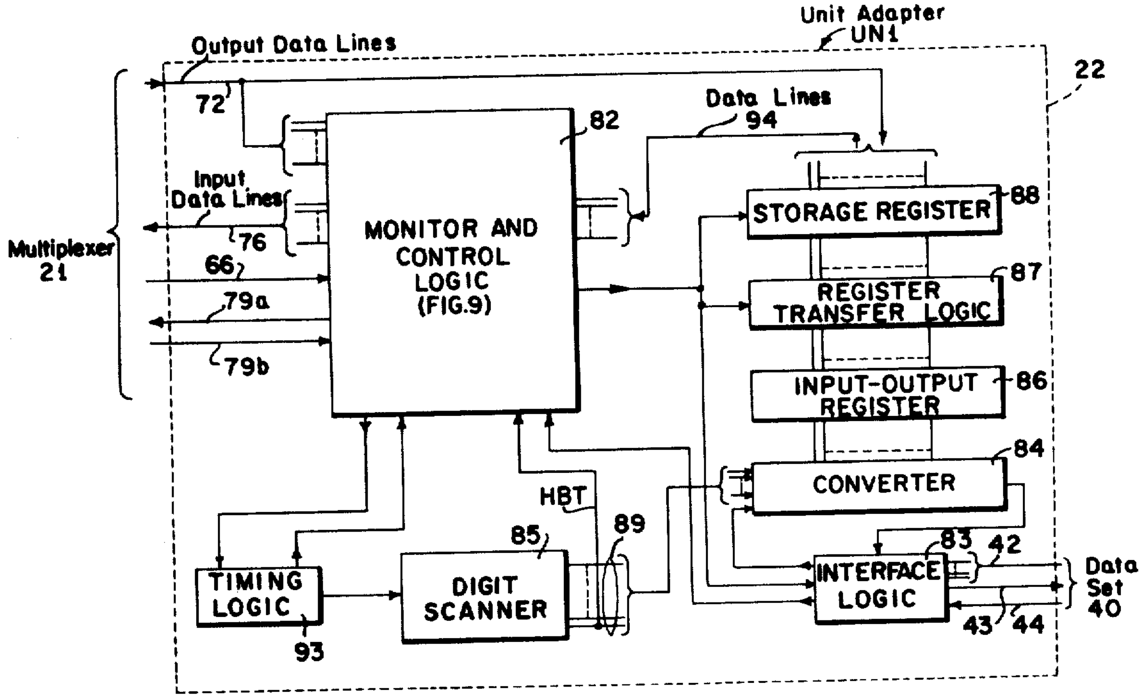
FIG. 3 is a schematic block diagram of the principle components of a typical unit adapter shown in FIG. 1.

Reference will next be made to FIGS. 2 and 3, showing a more detailed schematic block diagram of the multiplexer 21 and one of the connecting unit adapters 22, for a further description of the setting up of a unit adapter to operate in either an input or output data transfer mode. In order to selectively establish each of the unit adapters 22 to operate in either an input or output data transfer mode, a set of three selector characters as shown in FIG. 4 is required to be transferred from the computer 30 on IN-OUT command lines 34 to channel control logic 61 of the multiplexer 21. The first character, multiplexer selector 101, addresses the channel control logic 61 so that the subsequently transferred two selector characters, UN selector character 102 and function selector character 103, on lines 34 will be accepted by the control logic 61. The UN selector character 102 is transferred as signals HCN to a register 62 connecting to an address decoder 65 through switch logic 63. Register 62 is reset by signal RSM before the signals HCN are strobed into the register 62 by signal DL2. Then the content of register 62 is gated through switch logic 63 to an address decoder 65 by signal ACX. The address decoder 65 places a signal level on one of the lines 66 connecting to the unit adapter UN1, UN2—UN16 addressed by the stored content of register 62. The function selector character 103 directed in channel control logic 61 onto lines 57 is then gated by a signal on line 55 through select logic 71 onto output data lines 72. As shown in FIG. 3, the function selector character 103 on lines 72 is accepted by monitor and control logic 82 of only the particular one of the unit adapters 22 selected to be gated by a signal level on line 66. The circuitry of the particular unit adapter 22 is then reset or caused to operate in either an input or output transfer mode in response to the function selector character 103 transferred to it on lines 72, and a corresponding status signal is sent through interface logic 83 to the data set 40 via lines 42 to provide compatible operation of the data set 40 with the unit adapter 22.

Still referring to FIGS. 2 and 3, consideration will next be given to the multiplexer 21 and a unit adapter 22, established to operate in an input data transfer mode by a function selector character 103 shown in FIG. 4, i.e., to operate to transfer data from the data set 40 to the computer 30. Binary digits received on transmission lines 41 are serially transferred without delay through the connecting data set 40 to the unit adapters 22 that have been established to operate in an input transfer mode. The digits from a remote terminal appear on the input data line 44 of a unit adapter 22 in the sequence shown in FIG. 5, where it is seen that each data character 111 is preceded by a start bit 110 and followed by a stop bit 112. It should be noted that although the binary digits constituting a character are sequentially transferred at a fixed rate, the characters themselves are transferred from the remote terminal at a random rate dependent upon the real-time aspects of the system, and any elapsed time following a stop bit 112 and preceding a subsequent start bit 110 is filled with repetitive stop bits 112. The start bit 110 is of a binary state opposite the preceding stop bit 112 and the transition from a stop bit 112 to a start bit 110 is detected by interface logic 83 of the unit adapter 22. The gating of timing pulses from timing logic 93 to operate a digit scanner 85 provided in the unit adapter 22 is initiated by the detection of a start bit 110. Digit lines 89 from the digit scanner 85 connect to a data converter 84. The digit lines 89 are each associated with a binary digit in the data character 111 and the sequentially appearing signals on respective digit lines 89 convert the serial transfer of digits on input data line 44 from a serial-to-parallel form by strobing the digits into an input-output register 86. The last digit of the data character 111 is strobed into the input-output register 86 by a signal HBT from the digit scanner 85. The signal HBT is also connected to the monitor and control logic 82 and produces the parallel transfer of data character 111 from the input-output register 86 through interconnecting register transfer logic 87 to a storage register 88.

During the transfer of data characters received on the transmission lines 41 into the storage registers 88 of the associated unit adapters 22 established to operate in an input transfer mode, the counter 64 in the multiplexer 21 shown in FIG. 2 has been advancing by pulses from clock logic 75 to successively service the unit adapters 22. The sequential count outputs of the counter 64 are transferred through switch logic 63 to address decoder 65 which sequentially energizes each of lines 66. The signals on lines 66 interrogate, i.e., gate, respective connecting units UN1, UN2—UN16 to determine if any are ready for a data transfer with the computer 30. When one of the unit adapters 22 has a data character in the storage register 88 awaiting transfer to the computer 30, the unit adapter 22 will respond with a signal on line 79*a* at the time the described unit adapter 22 is interrogated by a signal on line 66 connecting to it from the address decoder 65. The signal on line 79*a* to channel control logic 61 produces a signal STS which stops the counter 64 at a count corresponding to the address of the responding unit adapter 22. The data character in the storage register 88 is transferred via data lines 94 through a common channel for transferring data from any unit adapters 22 to the computer 30, i.e., the data character is transferred through the monitor and control logic 82 onto input data lines 76 to parity generating logic 73, where a parity bit is appended, and then to EOM logic 74 which checks the character for an end-of-message format. The detection of an end-of-message character is sensed on line 77 leading to channel control logic 61 which then generates an acknowledging signal which is transferred to the computer 30 on one of the control lines 35. As the character is transferred to the computer 30 on input data lines 38, the address indicated by the output of the halted counter 64 is transferred through the channel control logic 61 to the computer 30 on control lines 35. The computer 30 accepts the data and sends back an acknowledging signal on line 36 which is transferred to the unit adapter 22 on line 79*b*, and signal STS is reset enabling counter 64 to be again advanced by timing pulses from clock logic 75.

Figure 5:
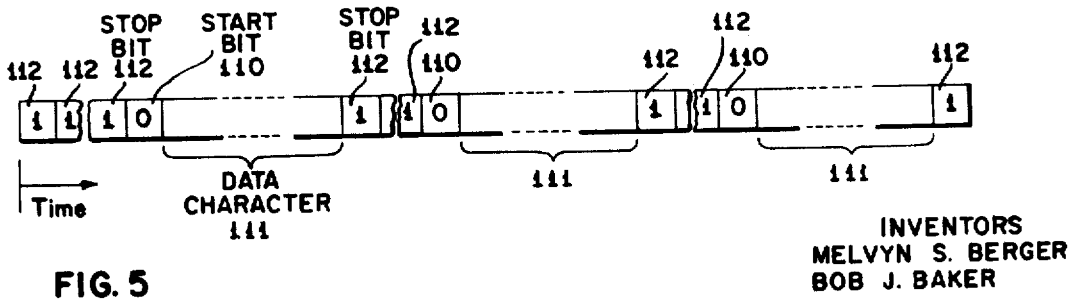
FIG. 5 is a schematic representation of the data characters included within the sequential order of binary digits transferred between a data set and a unit adapter.

Still referring to FIGS. 2 and 3, consideration will next be given to the multiplexer 21 and a unit adapter 22, established to operate in an output data transfer mode by a function character 103, i.e., to transfer data from the computer 30 to the data set 40. The unit adapter 22, established in an output transfer mode, will respond to an interrogating signal, i.e., gating signal, on its respective line 66 from the address decoder 65 if the unit adapter 22 is ready to receive an output data character as indicated by a signal on line 79*a* to the control logic 61. The timing pulses from clock logic 75 are then prevented from further advancing the counter 65 by signal STS generated in channel control logic 61. The output of the halted counter 64, which identifies the selected unit adapter 22 requesting a data character, is transferred through channel control logic 61 to the computer 30 on control lines 35. The computer responds by transferring a character via output data lines 37 through a common channel for transferring data from the computer 30 to any unit adapter 22, i.e., the character is transferred through parity check logic 70, wherein the parity of the character is verified, and then passed through select logic 71 to the receiving unit adapter 22 by way of output data lines 72. The character on output data lines 72 is stored in the storage register 88 and then transferred through register transfer logic 87 to the input-output register 86 by gating pulses from monitor and control logic 82. It now should be understood that unit adapter 22, when established to operate in an output transfer mode, operates to transfer a data character in a reverse sequence to the previously described unit adapter 22 established to operate in an input transfer mode. The series of sequential signals on respective digit lines 89 from the digit scanner 85 to the converter 84 serially strobe the stored digits from the input-output register 86 to the interface logic 83 where start and stop bits 110 and 112, respectively, are added to the data character 111, as illustrated in FIG. 5, and the bits are then serially transferred on output lines 43 to the connecting data set 40.

It should be noted that once a data character is transferred to the storage register 88, the counter 64 restarts to sequentially interrogate the unit adapters 22 for servicing; furthermore, when the character is transferred to the input-output register 86, then the unit adapter 22 is ready to receive another data character from the computer the next time it is serviced by the multiplexer 21.

Figure 6:
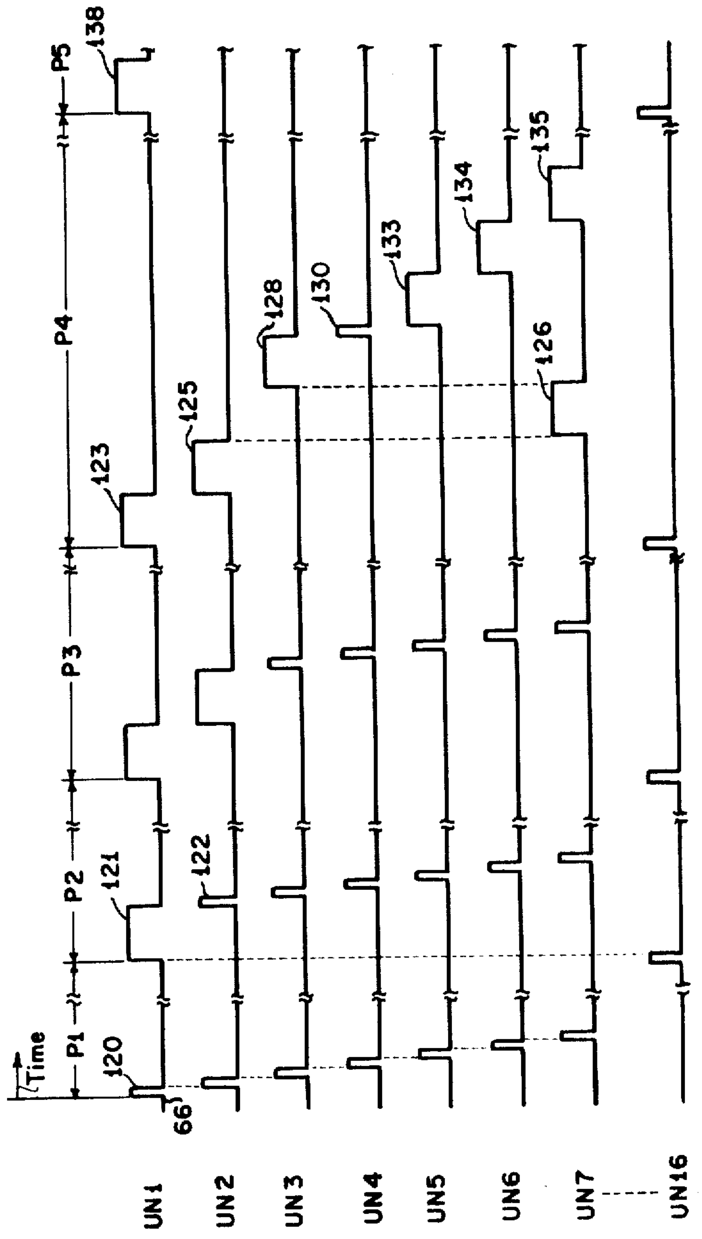
FIG. 6 is a timing diagram illustrating the dynamic variations in the scan rate of the unit adapters by the multiplexer.

Referring next to the circuit diagram of FIG. 2 and the timing diagram of FIG. 6, the time interval variations produced between the interrogations for a possible data transfer of an adapter unit, for example, adapter unit UN1, by the signal pulses on line 66 from the multiplexer 21 operating in an online real-time data processing environment will now be described. It will first be assumed that adapter units UN1, UN3, UN5 and UN7 have been established to operate in an input transfer mode and that adapter units UN2 and UN4 have been established to operate in an output transfer mode by the previously described transfer of the three selector characters, shown in FIG. 4, from the computer 30. The remaining units UN4 and UN8 through UN16, which were not established in a transfer mode, are inactive and do not transfer data during the time shown in FIG. 6. Time interval variations between subsequent data transfers from unit UN1 are increased as the number of active unit adapters 22 actually transferring data with the computer 30 during a scanner period is increased. series of sequential pulses to connecting units UN1, UN2—UN16 on lines 66 from the scanner 60 to form scanner time periods P1, P2, P3, P4 and P5, as illustrated in FIG. 6, which are the time intervals between successive interrogations of unit UN1 by the multiplexer 21. During the scanner period P1, each of the connecting units UN1, UN2—UN16 is interrogated by sequential signals, starting with pulse 120 to unit UN1, on lines 66 from the address decoder 65 and since none of the connecting adapter units is ready to transfer data to or from the computer 30, the pulses are quickly terminated. The scanner period P1 is illustrative of the shortest possible duration for the scan, i.e., the interrogation, of all the unit adapters to take place. During scanner period P2, the counter 64 is halted during the interrogation of unit UN1 by signal 121 and the signal level is retained during the transfer of data into the computer. Since the signal 121 to unit UN1 is prolonged, the time period P2 is greater than time period P1 and the time interval between successive interrogations of unit UN1 is correspondingly increased. During period P3, the counter 64 is halted as data is transferred from the connecting unit UN1 to the computer 30 and the counter 64 is again halted as data is transferred from the computer 30 to unit UN2, thereby delaying the successive pulses required to scan units UN3 and UN16 during scanner period P3, and further increasing the time interval between successive interrogations of unit UN1. It should be noted that either an input or an output data transfer similarly halts counter 64 during the data transfer and produces pulses of comparable widths, as shown in FIG. 6, which similarly contribute to an increase to the time interval between successive interrogations of unit UN1. During period P4, connecting units UN1 and UN2 both transfer data to the computer 30 during pulses 123 and 125, respectively. Following the data transfer from unit UN2, pulse 126 is produced by an intervening transfer of the content of register 62 through switch logic 63 to the address decoder 65 followed by the transfer of a function selector character, for example, an output mode, on the IN-OUT command lines 34 from the computer 30 to the connecting adapter unit UN7. It should be noted that having transferred the function code to the connecting adapter unit UN7, the interrupted sequence of data transfers with the connecting units UN1, UN2--UN16 is resumed and data is next transferred from unit UN3 to the computer 30 during pulse 128. Although unit UN4 has not been established with a transfer direction, it is still interrogated, in turn, as to its readiness to transfer data to, or from, the computer 30 by pulse 130. A data character is next transferred from unit UN5 to the computer 30 during pulse 133, which is then followed by the transfer of a data character from the computer 30 to unit UN6 during pulse 134. Unit UN7 was previously established in an output transfer mode by the function selection signals transferred during pulse 126 and unit UN7 now receives a data character from the computer 30 during pulse 135. The number of data transfers occurring during period P4 and the intervening transfer of a function code during pulse 126, has significantly prolonged the elapsed time between successive transfers of data from unit UN1 occurring during pulses 123 and 138. It is readily seen that an increased number of unit adapters could correspondingly increase the possible time interval between successive data transfers from unit UN1 and the result of the lengthened time intervals between successive data transfers from unit UN1 to the computer 30 will be considered further with reference to FIG. 7.

Figure 9:
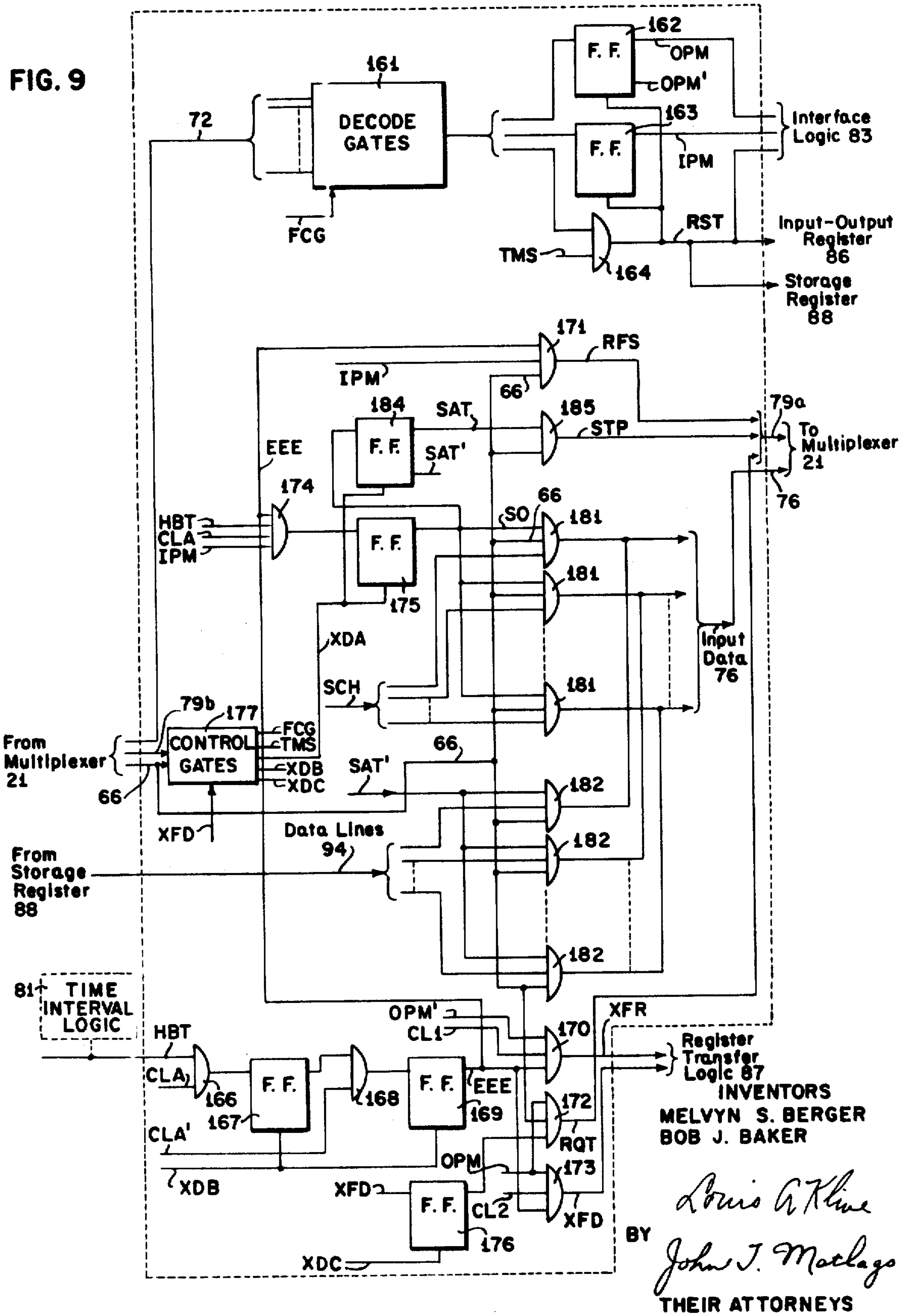
FIG. 9 is a schematic block diagram showing the overload detection circuitry included in the monitor and control logic of the unit adapters.

Before considering the timing diagram of FIG. 7, the circuitry included in monitor and control logic 82 and shown in FIG. 9 will first be described with reference to FIGS. 3 and 9 to provide an understanding as to the significance and effect of the signals shown in FIG. 7. A unit adapter 22 is established to operate in an input transfer mode by the previously described function selector character 103, shown in FIG. 4, which is transferred on lines 72 to decode gates 161 with a gating signal FCG, its being understood that signal FCG and other signal outputs from control gates 177 are produced from signals **79*b* and supplied to all the connecting units UN1, UN2—UN16, but gated only to this particular unit shown by the signal on line 66. Output signals from decode gates 161 are first strobed through gate 164 by timing pulse TMS to reset input-output register 86, storage register 88, interface logic 83, and flip-flops 162 and 163. An output signal from decode gates 161 then sets flip-flop 163 and signal IPM, connecting to the circuitry shown and interface logic 83, establishes the unit adapter 22 in an input data transfer mode, it being understood that signals to interface logic 83 denoting the status of the unit adapter 22 are transferred to the data set 40 on lines 42. As previously described, a unit adapter 22 operating in the input mode responds to serially transferred digits from the data set 40 on line 44, and pulses from digit scanner 85 to converter 84 on lines 89 sequentially strobe the digits of a data character into input-output register 86. The signal pulse that strobes the last digit of the data character into the input-output register 86 also connects to monitor and control logic 82 and is shown in FIG. 9 as the signal HBT which is transferred through gate 166 by sampling pulse CLA to set flip-flop 167. The signal output from flip-flop 167 is then gated by signal CLA', the inverse of signal CLA, through gate 168 to set flip-flop 169 and produce signal EEE. The concurrence of signal OPM' from flip-flop 162, signal EEE from flip-flop 169, and clocking signal CL1 produces signal pulse XFR from gate 170 to the register transfer logic 87, which transfers the data character from the input-output register 86 to the storage register 88 and the unit adapter 22 is now ready to transfer the data character through the multiplexer 21 to the computer. Signal EEE is still present, signal IMP is present and when the previously described interrogating signal on line 66 from the multiplexer 21 is present, the signal RFS from gate 171 to the multiplexer 21 is produced and the multiplexer 21 is thereby requested to transfer the data character onto input data lines 76, it being noted that signal data lines 94 from the storage register 88 are gated through gates 182 by signals SAT' and the signal on line 66. When the data on input data lines 76 has been accepted by the computer, signal XDB is gated through control gates 177 by the signal on line 66 to reset flip-flops 167 and 169 which gate off signal RFS. When signal RFS is off, the sequencing of signals from the multiplexer 21 on lines 66 to each of the units UN1, UN—UN16 is resumed, and the signal on line 66, to the particular unit shown that has completed the described data transfer to the computer, is turned off and thereby gating off the data signals on lines 76 to the multiplexer 21**.

In the event the data character in storage register 88 is not transferred to the multiplexer 21 before a subsequent data character is transferred from the data set 40 on line 44 and stored in the input-output register 86, signals HBT and EEE will both be true at the same time. The coincidence of signals HBT and EEE to gate 174 with timing pulse CLA and signal IPM from flip-flop 163 will set flip-flop 175 to produce signal SO. Flip-flop 184 is set by signal SO and signals SAT and SAT' are now present and absent, respectively, and when a signal is now present on line 66, an output signal STP is transferred through gate 185 in addition to signal RFS from gate 171 and a status character formed by the SCH signals is transferred through gates 181, by signal SO, onto input data lines 76 in place of a data character. Signals SCH on data lines 76 form a status character that is transferred to the computer 30 where it is recognized as indicating that an overload condition has occurred in the transferring unit adapter 22. Transfer of the status character onto input data lines 76 to the multiplexer 21 is completed when signals XDA and XDB reset flip-flops 167, 169, 175 and 184 and thereby gate off signals RFS, STP and the signals SCH transferred through gates 181.

Still referring to FIGS. 9 and 3, the circuitry shown in FIG. 9 will now be considered as it operates in a unit adapter 22 established in an output data transfer mode. The unit adapter 22 is established in an output transfer mode by the described function selector signals transferred to decode gates 161 by setting flip-flop 162 such that signal OPM is present and a signal IMP is absent. When the unit adapter 22 is subsequently interrogated by a signal on line 66 from the multiplexer 21, the signal on line 66 is retained as a data character is transferred from the computer through the multiplexer 21 to storage register 88. The multiplexer 21 then continues its sequential interrogation on lines 66 to each unit adapter 22, in order, as generally shown in FIG. 6. The data character is then transferred from storage register 88 to input-output register 86 by register transfer logic 87 and the emptied storage register 88 is ready to receive another data character from the computer when the unit adapter 22 is next interrogated by a signal on line 66. In the meantime, the series of sequential signals on respective digit lines 89 from the digit scanner 85 to the converter 84 serially strobe the digits from the input-output register 86 through interface logic 83 on output line 43 to the connecting data set 40. Signal pulse HBT strobes the last digit of the data character serially transferred from input-output register 86 and signal HBT is also connected to the circuitry shown in FIG. 9. The signal EEE, produced from signal HBT as previously described, is transferred by signal level OPM and timing pulse CL2 through gate 173 producing signal pulse XFD to set flip-flop 176. Signal XFD also causes register transfer logic 87 to transfer the contents of the storage register 88 to the recently emptied input-output register 86, and signal XFD connects to control gates 177, which now produces signal XDB to reset flip-flops 167 and 169. The signal output from set flip-flop 176 is transferred through gate 172 by signal OPM and when a signal on line 66 is next present, signal RQT to the multiplexer 21 requests that a data character be transferred to the now empty storage register 88. The transfer of a data character to the storage register 88 resets flip-flop 176, thus enabling the described transfer of data through the unit adapter 22 to be repeated.

Referring momentarily to FIG. 1, an adaptation of unit adapter UN16, will now be described, which cooperates with the multiplexer 21 to provide a line discipline for the online real-time operation of the computer. The line discipline is accomplished by having evenly spaced pseudodata transfers from the computer 30 to unit UN16 and not connecting a data set 40 to unit UN16. A predetermined number of these evenly spaced pseudodata transfers to unit UN16, which is readily equated to the passage of time, produces an interrupt in the computer 30 to the computer program being operated upon and during the interrupt a preselected subroutine is executed. The computer's automatic entry to a selected subroutine upon the passage of a predetermined interval of time provides a means for further linking the operation of the computer 30 to a real-time environment. For example, the data transfer to the computer 30 may be regulated by having a periodically executed subroutine first note the backlog of processing to be done by the computer 30 and then, correspondingly, change the number of unit adapters 22 transferring data to the computer 30 to maintain a consistent processing backlog for the computer 30. Referring again to FIGS. 3 and 9, the adaption of a unit adapter 22 for this use is easily implemented by connecting time interval logic 81, a source of signal pulses having selected time interval spacing, to the former HBT signal input line to gate 166 and with strobing signals CLA and its inverse CLA' corresponding to the pulse output from the time interval logic 81, the signals are transferred through gates 166 and 168 in the manner previously described, thereby effectuating the desired evenly spaced output pseudodata transfers from the computer 30. Furthermore, since the pseudodata is not transferred through unit UN16 to a data set 40, much of the circuitry shown in FIG. 3, i.e., the interface logic 83, the data converter 84, the input-output register 86, register transfer logic 87 and digit scanner 89, is eliminated and the remaining circuitry is correspondingly reduced.

Figure 7:
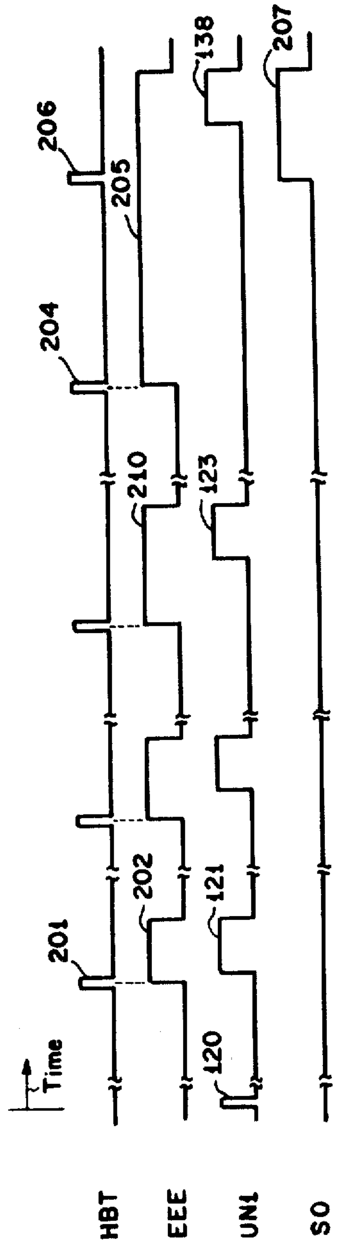
FIG. 7 is a timing diagram illustrating the operation of the overload detection circuitry.

The operation of the circuitry shown in FIG. 9 as data is transferred from the data set 40 through unit adapter UN1 will now be further considered, with reference to the timing diagram of FIG. 7, as the time interval between successive data transfers from unit UN1 to the computer 30 is increased. It should first be noted that signals on lines 66 from the multiplexer 21 to unit UN1 shown in FIG. 7 corresponds to the signals to unit UN1 previously described with reference to FIG. 6. The manner in which signals HBT, EEE and SO are produced was previously described with reference to FIG. 9 for unit adapter UN1 established with an input transfer direction and the significance of these signals will now be briefly considered with a momentary reference to FIG. 3. HBT pulses occur as the last bit of a data character, serially transferred from the data set 40, is strobed into input-output register 86 and the HBT pulse signifies that a complete data character has been transferred from data set 40 to the input-output register 86. Signal EEE goes true as a data character is transferred from input-output register 86 to storage register 88 and signal EEE remains true until the data character has been transferred from storage register 88 to multiplexer 21, these transfers occuring during pulses to unit UN1 shown in FIG. 7. Signal SO is produced by the concurrence of signals EEE with a HBT pulse and signal SO remains present until a status character has been transferred from monitor and control logic 82 to multiplexer 21 on lines 76. Referring more particularly to FIG. 7, signal EEE is not present when selection pulse 120 to unit UN1 occurs and data is not transferred at that time to the multiplexer 21. HBT pulse 201 denotes the transfer of a data character from the data set 40 to the input-output register 86 and the data character is transferred to the storage register 88 and stored there during EEE signal 202. The data character is transferred from the storage register 88 to the multiplexer 21 during unit UN1 selection pulse 121, thereby resetting signal level EEE. Successive data transfers are effectuated during subsequent unit UN1 selection pulses as shown in FIG. 7 where it is seen that the time duration of the EEE signal pulses is progressively increased by the increasingly delayed selection pulses to unit UN1, which were previously described with reference to FIG. 6. It is finally seen that after EEE signal level 210 is reset by the transfer from storage register 88 during unit UN1 pulse 123, HBT pulse 204 is followed by EEE signal level 205 that is sustained beyond the occurrence of HBT pulse 206, these signals indicating that data characters are now stored in both storage register 88 and input-output register 86. The coincidence of HBT pulse 206 and EEE signal level 205 causes flip-flop 175, shown in FIG. 9, to be set producing SO signal level 207 and a status character is transferred to the multiplexer 21 on input data lines 76 during unit UN1 selection pulse 138. In this manner the described overload condition is detected by unit adapter UN1 and the status character, indicating that an overload has occurred, is transferred to the multiplexer 21.

Figure 8:
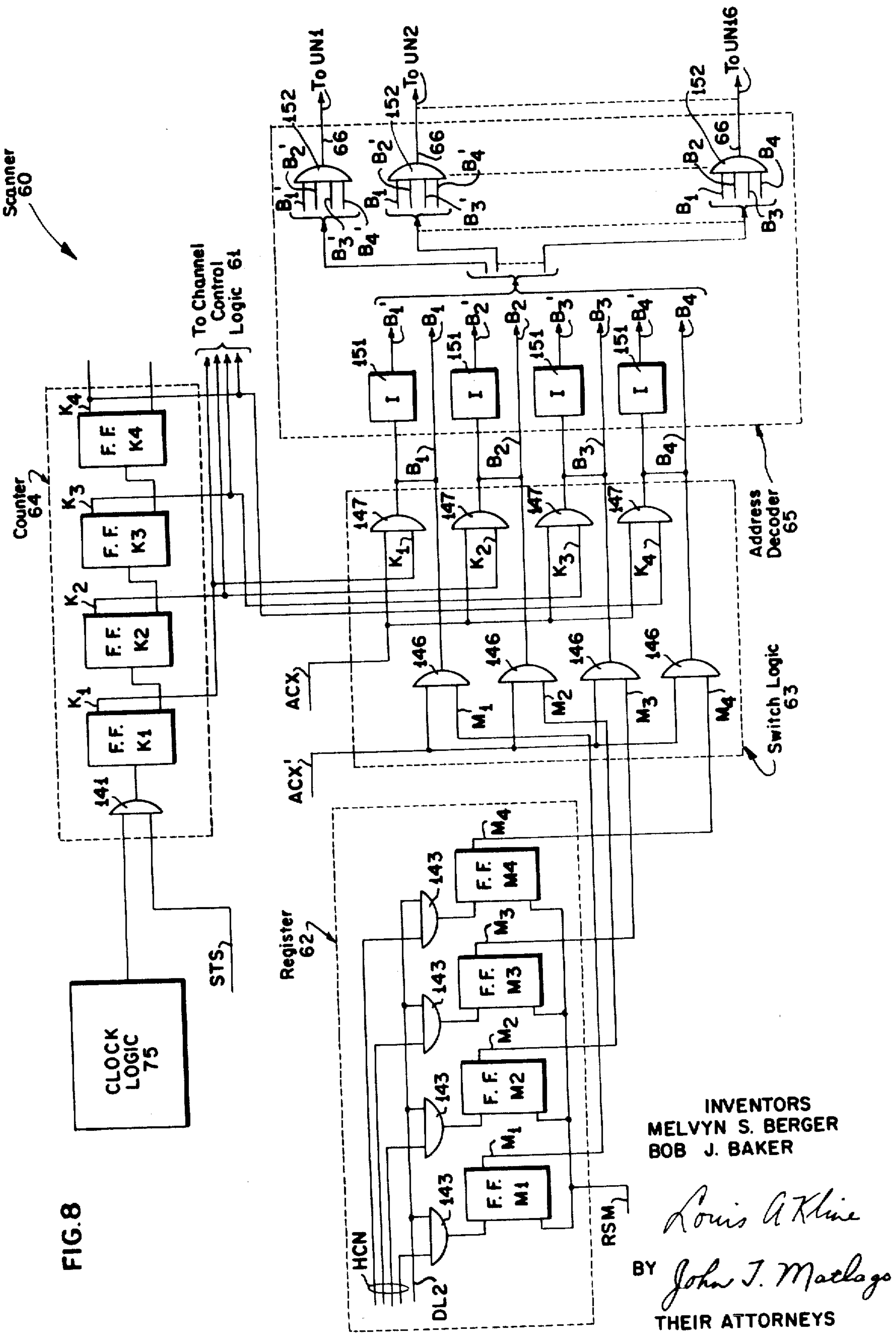
FIG. 8 is a schematic block diagram of the circuits shown in FIG. 2 for selecting the unit adapters.

The logic circuitry of the scanner 60 previously considered with reference to FIG. 2 will now be more particularly described with reference to FIG. 8. The scanner 60 includes the counter 64 and the register 62 connecting through switch logic 63 which gates the contents of either counter 64 or register 62 to the address decoder 65. The counter 64 is comprised of flip-flops K1, K2, K3 and K4 serially connected as a four stage counter having outputs $K_1$, $K_2$, $K_3$ and $K_4$ which are connected to switch logic 63 and to channel control logic 61 shown in FIG. 2. The four flip-flops k1, K2, K3 and K4 are interconnected so that the binary count is continually advanced from 0 through 15 by each pulse from the clock logic 75 that is gated through gate 141 by signal STS. Register 62 includes gates 143 connecting to flip-flops M1, M2, M3 and M4 so that binary digits HCN are gated through gates 143 by signal DL2 and stored in flip-flops M1, M2, M3 and M4. Signals $M_1$, $M_2$, $M_3$ and $M_4$ from register 62 and signals $K_1$, $K_2$, $K_3$ and $K_4$ from the counter 64 are connected to gates 146 and 147, respectively, in the switch logic 63. Signal ACX gates the signals from counter 64 through gates 147 to the address decoder 65 or, alternately, signal ACX', the inverse of signal ACX, gates the signals from register 62 through gates 146 to address decoder 65. An inverter 151 for each input signal $B_1$, $B_2$, $B_3$ and $B_4$ produces corresponding inverse signals $B_1'$, $B_2'$, $B_3'$ and $B_4'$ and these signals are connected, as shown, to 64 input gates 152 so that a binary number represented by these signals is decoded to raise a signal level on selection lines 66 to corresponding units UN1, UN2—UN16. Accordingly, with signal STS gating pulses from clock logic 75 to counter 64 and signal ACX gating signals $K_1$, $K_2$, $K_3$ and $K_4$ to the address decoder 65, an output signal is sequentially applied on each selection line 66, in order. Further, signal STS inhibits the transfer of timing pulses to counter 64 when signals $M_1$, $M_2$, $M_3$ and $M_4$ from the register 62 are gated to address decoder 65 by signal ACX', and, therefore, the sequence of signal levels on lines 66 produced by signals from the counter 64 is consistent, even though there might be intervening transfers of signals from register 62 to the address decoder 65. Since the data transfers of each of the connecting units UN1, UN2—UN16 are ordered by the signal levels on lines 66 produced by signals $K_1$, $K_2$, $K_3$ and $K_4$ from the counter 64 which are consistently sequenced, each of the connecting units UN1, UN2—UN16 is given an equal opportunity to transfer data. Although the scanner has been described as only having 16 output signals each connecting to a separate connecting unit UN1, UN2—UN16, additional connecting units would often be desirable and the circuitry shown is readily expandable by extending register 62, counter 64, and gating circuitry of switch logic 63 and of address decoder 65 to accommodate the increased number of connecting units.

The operation of the communications multiplexer circuitry in a real-time online data processing environment as the connecting units UN1, UN—UN16 are controlled by the computer 30 and data is transferred from the data set 40 through the communications multiplexer 20 to the computer 30 will now be described by first referring to the general block diagram of FIG. 1 and the circuit block diagram of FIG. 2. In order to selectively establish unit UN1 in an input transfer mode, the selector characters shown in FIG. 4 are sequentially transferred from the computer 30 on IN-OUT command lines 34 to the multiplexer 21. The multiplexer selector character 101 first addresses the channel control logic 61 so that the subsequent two characters transferred on the IN-OUT command lines 34 will be accepted by it. The UN selector character 102 is next placed on IN-OUT command lines 34 by the computer 30 and corresponding HCN signals are transferred into register 62. In the meantime, the contents of counter 64, advanced by the pulses from clock logic 75, are gated through switch logic 63 to address decoder 65 and sequentially produce signals on lines 66 to units UN1, UN—UN16, in order. The counter 64 is halted by signal STS and the content of register 62 is gated through switch logic 63, by signal ACX, to address decoder 65 which places a signal level on a line 66 to unit UN1. The function selector character 103 from the computer 30 is transferred through channel control logic 61 on line 57 and through select logic 71 on output lines 72 to all connecting units UN1, UN2—UN16; however, it is only accepted by unit UN1 which was selected by the signal on line 66 to UN1 from the address decoder 65. After the function selector character 103 has been transferred to unit UN1, signal ACX gates the content of counter 64, which is gain advanced by pulses from clock logic 75, through switch logic 63 to address decoder 65 and thereby resumes the ordered sequence of signals on lines 66 produced by the content of counter 64. It should be understood that a function selector character can be transferred to any selected one of units UN1, UN2—UN16 by repeating the described transfer of the three characters 101, 102 and 103 with a UN selector character 102 corresponding to the selected unit UN1, UN2—UN16 and producing a signal on line 66 to that selected unit.

The description will now be continued with reference to the circuitry for unit UN1 shown in FIGS. 3 and 9. The function selector character 103 on line 72 is transferred through decode gates 161 and sets flip-flop 163 making IPM true and transferring a corresponding signal to data set 40 on line 42, thereby establishing unit adapter 22 and data set 40 in an input transfer mode. The unit adapter 22 then awaits the transfer of data from the connecting data set 40, the occurrence of the transferred data may depend upon an online event, such as an operator action, at a remote data terminal. The data set 40 serially transfers binary digits to the interface logic 83 on input data line 44 in the sequence shown in FIG. 5, where it is seen that each data character 111 is preceded by the start bit 110 and followed by the stop bit 112. The transition from a stop bit 112 to a start bit 110 is detected by interface logic 83 and produces a signal from interface logic 83 through monitor and control logic 82 to timing logic 93 which initiates a sequential series of signals from the digit scanner 85 to the data converter 84 to strobe the data character into the input-output register 86. Referring now to FIGS. 3 and 7, the HBT pulse 201 strobes the last digit of the data character 111 into the input-output register 86 and produces EEE signal level 202 which causes the data character 111 to be transferred to storage register 88 and EEE signal level 202 remains present during the time that data is in the storage register 88 awaiting transfer to the multiplexer 21. Referring momentarily to FIG. 2, during the described transfer of a data character through unit UN1, pulses from clock logic 75 sequentially advance the contents of counter 64 which are gated through switch logic 63 to address decoder 65 producing the sequential pulses in period P1 shown in FIG. 6. During the signal pulse 121 to unit UN1, shown in both FIGS. 6 and 7, the contents of storage register 88 are transferred to the multiplexer 21 on input data lines 76 and EEE signal level 202 is completed. Referring momentarily to the multiplexer circuitry shown in FIG. 2, it is seen that the data characters are transferred on lines 76 through the common channel for transferring data from any unit adapter 22 to the computer 30, i.e., the data character is transferred through parity generating logic 73, wherein a parity digit is added to the data character, and through EOM logic 74 to the computer 30 on input data lines 38.

Referring to FIGS. 3 and 7, HBT pulses are produced each time a data character is strobed into the input-output register 86, EEE signal levels are true during the time that a data character is stored in the storage register 88 and data characters are transferred from the unit adapter 22 to the multiplexer 21 during pulses to unit UN1 that are coincident with EEE signal pulses. Referring momentarily to FIG. 6, it is noted first that the pulses to unit UN1 shown in FIG. 7 correspond to those shown in FIG. 6, and, secondly, that the time interval between pulses to unit UN1 is related to the activity of the other units UN2—UN16.

Still referring to FIGS. 3 and 7, the operation of the unit UN1 will now be described during the time period between UN1 pulses 123 and 138. Following the data transfer to the multiplexer 21 during the pulse 123, the input-output register 86 is filled at HBT pulse 204 by the serially transferred data character from the data set 40 on input line 44. The data character is transferred from the input-output register 86 to the storage register 88 where it remains during EEE pulse 205. In the meantime, the input-output register 86 is again filled at HBT pulse 206 and the concurrence of HBT pulse 206 and EEE pulse 205 produces SO signal 207. At the time of pulse 138 to unit UN1, the SO signal 207 is present indicating the occurrence of an overload and a status character is transferred on input data lines 76 in place of a data character from storage register 88 and the status character is inputted to the computer. The receipt of the status character by the computer is acknowledged by a signal transferred through the multiplexer 21 and clears the overload in the unit UN1 by resetting the flip-flops 175 and 184 shown in FIG. 9.

Referring now to FIGS. 2 and 3, when the computer 30 receives the status character from unit UN1, a typical response would be a sequential transfer of the three characters shown in FIG. 5 on IN-OUT command lines 34 to change the transfer mode of unit UN1 from input to output. The first character, multiplexer selector 101, addresses the multiplexer 21 so that it will accept the second character, UN selector 102 which is transferred to register 62. The content of register 62 is then gated through switch logic 63 by signal ACX to address decoder 65, which produces a signal on line 66 to unit UN1. The third character, function selector 103, is transferred through control logic 61 on lines 57 and gated through select logic 71 by a signal on line 55 to output lines 72 connecting to units UN1, UN2—UN16. The signals on output lines 72 are accepted by unit UN1, which was selected by the signal on line 66, and these signals change the transfer mode of unit UN1 from input to output by setting flip-flop 162 shown in FIG. 9 and making signal OPM true. Having transferred the character to unit UN1 and thereby changed its transfer mode, the sequential series of interrogating signals on lines 66, which give each of the units UN1, UN2—UN16, in order, an opportunity to transfer data, is resumed.

Still referring to FIGS. 2 and 3, the unit UN1 will respond to an interrogating signal on its line 66 from the address decoder 65, indicating thereby that the unit UN1 is ready to receive a data character from the computer 30. The timing pulses from clock logic 75 are then prevented from further advancing the counter 64 by signal STS. The output of the halted counter 64, which identifies unit UN1 requesting a data character, is transferred through channel control logic 61 to the computer 30 on control lines 35. The compute responds by transferring a character via output data lines 37 through the common channel for transferring data from the computer 30 to any unit adapter 22, i.e., the character is transferred through parity check logic 70, wherein the parity of the character is verified, and then passed through select logic 71 to the receiving unit adapter 22 by way of output data lines 72. The character on output data lines 72 is accepted by unit UN1, stored in storage register 88, and the sequential series of interrogating signals on lines 66 are again resumed.

The data character is then transferred from the storage register 88 to the input-output register 86 by register transfer logic 87, and the unit UN1 is now ready to receive another character from the computer 30 the next time it is serviced by the multiplexer 21. The series of sequential signals on respective digit lines 89 from the digit scanner 85 to the converter 84 serially strobe the stored digits from the input-output register 86 through interface logic 83 on output line 43 to the connecting data set 40. The described transfer of characters from the computer is repeated so that an output message, comprises of a plurality of characters, is sent to a connecting data terminal. The output message requests that the connecting data terminal retransfer the previously interrupted input message, comprises of a plurality of characters and including those characters that were stored in the storage register 88 and input-output register 86 of unit UN1 when the previously described overload occurred. Unit UN1 is then again established in an input transfer mode by the signals on IN-OUT command lines from the computer and the message from the connecting data terminal is transferred via unit UN1 through the multiplexer 21 to the computer 30 by interleaving the characters of the message from unit UN1 with the characters of messages transferred by other units UN2—UN16.

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages. It is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

We claim:

1. A communications system for transferring data between a computer and a plurality of remote data terminals, comprising: a plurality of unit adapters, each connected to one of said remote data terminals and each capable of being operated in an input or output data transfer mode; a common channel for transferring data between any selected one of said unit adapters and said computer; a register responding to control data from said computer for connecting any selected one of said unit adapters to said common channel; means for transferring control data from said computer through said common channel to a unit adapter selected by the register for setting up the mode of operation of said unit adapter; and a scan counter capable of operatively connecting each of said unit adapters, in turn, to said common channel, for transferring data therethrough in accordance with the transfer mode of the respective unit adapters.

2. The invention in accordance with claim 1 wherein storage means are included in each of said unit adapters for temporarily storing data being transferred therethrough.

3. The invention in accordance with claim 1 including monitor means in each of said unit adapters for sensing an input data transfer overload condition therein and causing a status signal to be transferred over the common channel to the computer at the time the unit adapter is operatively connected thereto by the scan counter.

4. The invention in accordance with claim 1 wherein a unit adapter has been set to operate in an input data transfer mode, and wherein said unit adapter includes a first and second storage means, said first storage means for storing data received from the remote data terminal; transfer means for transferring data from said first to said second storage means; and monitor means for sensing when both said first and second storage means are storing input data and causing a status signal indicative of an overload condition to be transferred over the common channel to the computer at the time the unit adapter is operatively connected thereto by the scan counter.

5. A communications system for transferring data between a computer and a plurality of remote data terminals, comprising: a plurality of unit adapters, each connected to one of said remote data terminals and capable of being operated in an input or output data transfer mode; a common channel for transferring data between any selected one of said unit adapters and said computer; a register capable of being arbitrarily set to provide output address signals to connect any selected one of said unit adapters to said common channel; means responding to control data from said computer for setting said register and for transferring control data through said common channel to the selected unit adapter for setting the mode of operation thereof; and a scanning counter providing output address signals for interrogating each of said unit adapters, in turn, to detect if a return signal from one of said unit adapters is ready to transfer data, including means for operatively connecting each unit adapter in a ready condition to said common channel, for transferring data therethrough in accordance with its transfer mode.

6. The invention in accordance with claim 5, wherein a unit adapter has been set to operate in an output data transfer mode; and wherein circuit means are provided for transferring output address signals of the scanning counter to the compute when said return signal from said unit adapter is detected to be ready to transfer data.

7. The invention in accordance with claim 5, wherein a unit adapter has been set to operate in an input data transfer mode; and wherein circuit means are provided for transferring the output address signals of the scanning counter to the computer when said return signal from said unit adapter is detected to be ready to transfer data.

8. The invention in accordance with claim 5, including address decoder means responsive to the output address signals provided by one of said register and said scan counter for operatively connecting any selected one of said unit adapters to said common channel.

9. A communications system for transferring data between a computer and a plurality of remote data terminals, comprising: a plurality of unit adapters, each connected to one of said remote data terminals and each initially set to operate in an input or output data transfer mode; a common channel for transferring data between a selected one of said unit adapters and said computer; a scanning counter capable of cyclically operating to connect each of said unit adapters, in turn, to said common channel, for transferring data therethrough in accordance with its transfer mode; and register means capable of interrupting the counting action of said scanning counter at any count of its cycle and connecting said common channel to a selected one of said unit adapters for changing the data transfer mode thereof, in response to control data from said computer, said scanning counter then resuming its cyclical operation of connecting each of said unit adapters, in turn, to said common channel, by starting with the unit adapter identified by the count of the scanning counter at the time it was interrupted.

10. The invention in accordance with claim 9, wherein each said unit adapter includes a buffer register means for temporarily storing data being transferred in series to or from its connected remote data terminal.

11. A communications multiplexer system for transferring data characters between a computer and a plurality of remote data terminals, comprising: a plurality of unit adapters, each connected to a remote terminal and means enabling each to be set to transfer a data character in an input or output transfer mode in response to a function character transferred to the unit adapter from the computer; a multiplexer circuit capable of being selectively gated to each of said unit adapters for transferring data characters between the computer and said remote terminals in accordance with the transfer mode of each unit adapter; scanner means included in said multiplexer circuit for gating in an ordered sequence each of said unit adapters ready to effect the transfer of data characters therethrough; and control means included in said multiplexer circuit and responding to control data from the computer for interrupting the gating in an ordered sequence of each of said unit adapters in order to gate a function character from the multiplexer to a particular one of said unit adapters, said control means included in said multiplexer circuit including means enabling resumption of the gating in an ordered sequence of each of said unit adapters following the transfer of the function character from the multiplexer to the particular one of said unit adapters.

12. A communications system for transferring data between a computer and a plurality of remote data terminals, comprising: a plurality of unit adapters, each connected to one of said remote data terminals and each capable of operating in an input or output data transfer mode; a common channel for transferring data between any selected one of said unit adapters and said computer; a register responding to control data from said computer for connecting any selected one of said unit adapters to said common channel; means for transferring control data from said computer through said common channel to a unit adapter selected by said register for setting up the mode of operation of said unit adapter; a scan counter providing output address signals for sequentially interrogating each of said unit adapters; and control means for temporarily stopping said scan counter when an interrogated unit adapter is detected to be in a condition to transfer data and for operatively connecting said unit adapter to said common channel for transferring data therethrough in accordance with the transfer mode of the respective unit adapter.

13. The invention in accordance with claim 12, wherein circuit means are provided to transfer the output address signals of the scan counter to the computer when a unit adapter is detected that is in a condition to transfer data.

14. In a real-time communications system for transferring data characters provided by each of a plurality of remote data terminals at a relatively slow, random rate to a high speed digital computer, comprising: a plurality of unit adapters, each capable of temporarily storing a data character received at a random rate from one of said remote data terminals; a common channel for transferring a data character from any selected one of said unit adapters to said computer; a cyclically operated scan counter whose count output identifies each of said unit adapters for sequentially interrogating each of said unit adapters, in turn, at a high rate; and means for temporarily holding the count output of said scan counter each time a unit adapter is detected to be storing a data character to enable said unit adapter to transfer the data character through said common channel to said computer.

15. The invention in accordance with claim 14, including means for transferring along with the transfer of a data character to said computer, the count output of the scan counter that identifies the unit adapter supplying the data the scan 16. In a real-time communications multiplexer system for transferring a different multicharacter data message from each of a plurality of remote data terminals, said messages being transferred one character at a time in an interleaved manner to a high speed digital computer, comprising: a plurality of unit adapters, each capable of temporarily storing one of the data characters of the message being recieved in a random rate from one of said remote data terminals; a multiplexer capable of transferring data characters of the messages, in an interleaved manner, as received one at a time from different ones of said unit adapters; a cyclically operated scan counter whose count output identifies each of unit adapters for sequentially interrogating each of said unit adapters, in turn, at a high rate; circuit means for temporarily holding the count output of said scan counter when a unit adapter is detected to be storing a data character of a message being received from a data terminal, to enable said unit adapter to transfer the data character through said multiplexer to said computer; and further circuit means responsive to the count output of said scan counter to identify each data character being transferred in an interleaved manner through the multiplexer as being a part of the message being received from one of said remote data terminals.